United States Patent
Maddulapalli et al.

(10) Patent No.: US 12,486,862 B2
(45) Date of Patent: Dec. 2, 2025

(54) SOLAR MODULE WASHER CLIP

(71) Applicant: Nextracker LLC, Fremont, CA (US)

(72) Inventors: Raghavendra Praveen Maddulapalli, Telangana (IN); Abhimanyu Anil Sable, Telangana (IN); Ricardo Delgado-Nanez, San Jose, CA (US)

(73) Assignee: NEXTRACKER LLC, Fremont, CA (US)

(*) Notice: Subject to any disclaimer, the term of this patent is extended or adjusted under 35 U.S.C. 154(b) by 77 days.

(21) Appl. No.: 18/452,675

(22) Filed: Aug. 21, 2023

(65) Prior Publication Data
US 2025/0067290 A1    Feb. 27, 2025

(51) Int. Cl.
F16B 2/22      (2006.01)
F16B 43/00     (2006.01)
H02S 30/10     (2014.01)

(52) U.S. Cl.
CPC ........... *F16B 2/22* (2013.01); *F16B 43/00* (2013.01); *H02S 30/10* (2014.12)

(58) Field of Classification Search
CPC ......... F16B 2/22; F24S 25/632; F24S 25/634; F24S 25/636; F24S 2025/804; F24S 2025/807; H02S 30/00
See application file for complete search history.

(56) References Cited

U.S. PATENT DOCUMENTS

| | | |
|---|---|---|
| 10,530,293 B2 | 1/2020 | Legall et al. |
| 10,852,038 B2 | 12/2020 | Rothschild |
| 11,563,402 B2 | 1/2023 | Corio |
| 2014/0220834 A1 | 8/2014 | Rizzo |
| 2016/0282018 A1* | 9/2016 | Ash ............... F24S 25/636 |
| 2016/0365827 A1* | 12/2016 | Au ................. F16B 5/0621 |
| 2017/0302219 A1* | 10/2017 | Rothschild ........ F24S 25/11 |

(Continued)

FOREIGN PATENT DOCUMENTS

| | | |
|---|---|---|
| CN | 206282991 U | 6/2017 |
| CN | 116420307 A | 7/2023 |

(Continued)

OTHER PUBLICATIONS

International Searching Authority, "International Search Report and Written Opinion", From Application No. PCT/US2024/042643, Mailed Nov. 25, 2024, pp. 17.

(Continued)

*Primary Examiner* — Angelo Trivisonno
(74) *Attorney, Agent, or Firm* — Fredrikson & Byron, P.A.

(57) ABSTRACT

A washer clip device includes a first clip arm, a second clip arm, at least one grounding element at the first clip arm and/or the second clip arm, and a fastening aperture extending through the first clip arm. The first and second clip arms are joined together at a first end of the washer clip device to define a first internal clip area adjacent the first end, and the first and second clip arms are spaced apart from one another at a second end of the washer clip device to define a receiving gap between the first and second clip arms and adjacent to the second end. This washer clip device is movable between a coupling configuration and a receiving configuration, with the receiving gap being larger when in the receiving configuration than when in the coupling configuration.

18 Claims, 8 Drawing Sheets

(56) References Cited

U.S. PATENT DOCUMENTS

2022/0029579 A1    1/2022    Cavieres Pinilla

FOREIGN PATENT DOCUMENTS

WO    2014008085 A1    1/2014
WO    2022035755 A1    2/2022

OTHER PUBLICATIONS

Arlington Industries "Arlington Snap-on Wire Clip", brochure Mar. 2012.
Araymond "Instruction Manual PowAR Cinch" Fastening & Grounding clip for Framed Modules on trackers or ground Mount Ref: 240865 & 243648, Nov. 28, 2016.

* cited by examiner

FIG. 6

SOLAR MODULE WASHER CLIP

TECHNICAL FIELD

This disclosure relates generally to device, system, and method embodiments for coupling a solar module to a support member. Embodiments disclosed herein can include a washer clip device for coupling the solar module to the support member, with the washer clip device being movable between a coupling configuration and a receiving configuration to help receive the solar module thereat and then couple to the solar module once so received.

BACKGROUND

Solar panels can convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels can be difficult and time-consuming to assemble in the field. Cumbersome frames, attachment members, and assembly techniques are often required. And, yet, such cumbersome frames, attachment members, and assembly techniques can result in undesirably, highly/locally concentrated attachment clamping forces on the solar module.

SUMMARY

This disclosure in general describes embodiments of devices, systems, and methods for coupling one or more solar modules to a support structure. Such embodiments disclosed herein can be configured to facilitate relatively quick and efficient solar module system assembly in the field. And, yet, such embodiments can additionally distribute the clamping force applied (e.g., by a washer clip device) at a given solar module (e.g., at a given solar module frame) over a wider area thereby providing a more structurally robust, longer useful life for the coupled solar module system. Accordingly, such embodiments disclosed herein can be useful for the dual purposes of increasing solar module system assembly in the field while at the same time facilitating a more structurally robust, longer useful life for the system.

One embodiment includes a solar module system. This solar module system includes a solar module, a support rail, and a washer clip device. The solar module includes a frame and a plurality of photovoltaic cells. The support rail is configured to couple the solar module to a movable torque tube. And the washer clip device couples the solar module to the support rail. The washer clip devices includes a first clip arm, a second clip arm, at least one grounding element at the first clip arm and/or the second clip arm, and a fastening aperture extending through the first clip arm. The first clip arm and the second clip arm are joined together at a first end of the washer clip device to define a first internal clip area adjacent the first end, and the first clip arm and the second clip arm are spaced apart from one another at a second end of the washer clip device to define a receiving gap between the first clip arm and the second clip arm and adjacent to the second end. The receiving gap is configured to receive at least the frame of the solar module. The washer clip device is movable between a coupling configuration and a receiving configuration, with the receiving gap being larger when the washer clip device is in the receiving configuration than when the washer clip device is in the coupling configuration.

According to a further embodiment of this system, the first clip arm is sandwiched between at least the frame and the support rail. For example, the support rail can include a support rail fastening aperture, and the fastening aperture at the first clip arm can be aligned with the support rail fastening aperture when the first clip arm is sandwiched between at least the frame and the support rail. As another example, the first clip arm can include an internal surface that faces the second clip arm and an external surface that is opposite the internal surface. The external surface of the first clip arm can include a planar external panel support surface, and the planar external panel support surface can be positioned to directly interface with the frame. In some such examples, the washer clip device can further include at least one grounding element that is located at the internal surface of the first clip arm and projects outward from the internal surface toward the second clip arm. In such examples, the washer clip device, including the at least one grounding element and the first clip arm, can include an electrically conductive material, and the electrically conductive material can be in contact with the solar module.

According to a further embodiment of this system, the washer clip device can be biased to the coupling configuration. For example, the first clip arm and the second clip arm can be elastically movable from the coupling configuration to the receiving configuration. In some such examples, when the washer clip device is in the coupling configuration, the first clip arm and the second clip arm can be spaced further apart where the first internal clip area is defined than where the receiving gap is defined. In one particular such example, when the washer clip device is in the coupling configuration, the first clip arm and the second clip arm can be spaced apart by a distance ranging from 2.5 mm to 4.5 mm (e.g., ranging from 3.0 to 4.0 mm) where the receiving gap is defined. In another alternative or additional example, the first end of the washer clip device, where the first clip arm and the second clip arm are joined together, can be configured to apply a biasing force at the second end of the washer clip device to bias the washer clip device to the coupling configuration.

Another embodiment includes a washer clip device. This washer clip device includes a first clip arm, a second clip arm, at least one grounding element at the first clip arm and/or the second clip arm, and a fastening aperture extending through the first clip arm. The first clip arm and the second clip arm are joined together at a first end of the washer clip device to define a first internal clip area adjacent the first end, and the first clip arm and the second clip arm spaced apart from one another at a second end of the washer clip device to define a receiving gap between the first clip arm and the second clip arm and adjacent to the second end. This washer clip device is movable between a coupling configuration and a receiving configuration, with the receiving gap being larger when the washer clip device is in the receiving configuration than when the washer clip device is in the coupling configuration.

According to a further embodiment of this device, the first end of the washer clip device can be opposite the second end of the washer clip device. The first clip arm can include an internal surface that faces the second clip arm and an external surface that is opposite the internal surface. The external surface of the first clip arm can include a planar external panel support surface, and this planar external panel support surface is configured to support thereat a solar module.

According to a further embodiment of this device, the washer clip device further includes at least one grounding element that is located at the internal surface of the first clip arm and projects outward from the internal surface toward the second clip arm. In one such example, the washer clip device, including the at least one grounding element and the first clip arm, can include an electrically conductive material to provide electrical grounding.

According to a further embodiment of this device, the washer clip device is biased to the coupling configuration. In one such example, the first clip arm and the second clip arm are elastically movable from the coupling configuration to the receiving configuration. For instance, when the washer clip device is in the coupling configuration, the first clip arm and the second clip arm can be spaced further apart where the first internal clip area is defined than where the receiving gap is defined. This could include, when the washer clip device is in the coupling configuration, the first clip arm and the second clip arm being spaced apart by a distance ranging from 2.5 mm to 4.5 mm where the receiving gap is defined. Additionally or alternatively, the first end of the washer clip device, where the first clip arm and the second clip arm are joined together, can be configured to apply a biasing force at the second end of the washer clip device to bias the washer clip device to the coupling configuration.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are intended for use in conjunction with the explanations in the following detailed description wherein like reference characters denote like elements. Examples of the present invention will hereinafter be described in conjunction with the appended drawings.

FIGS. 2A-2C illustrate one embodiment of a washer clip device.

FIGS. 5A-5C illustrate another embodiment of a washer clip device.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Embodiments disclosed herein include various devices, systems, and methods configured to allow for coupling one or more solar modules to a support structure in an improved manner. Certain such embodiments disclosed herein can be configured to facilitate relatively quick and efficient solar module system assembly in the field while also helping to better distribute applied clamping force at a given solar module to thereby provide a more structurally robust, longer useful life for the system.

Figure 1:
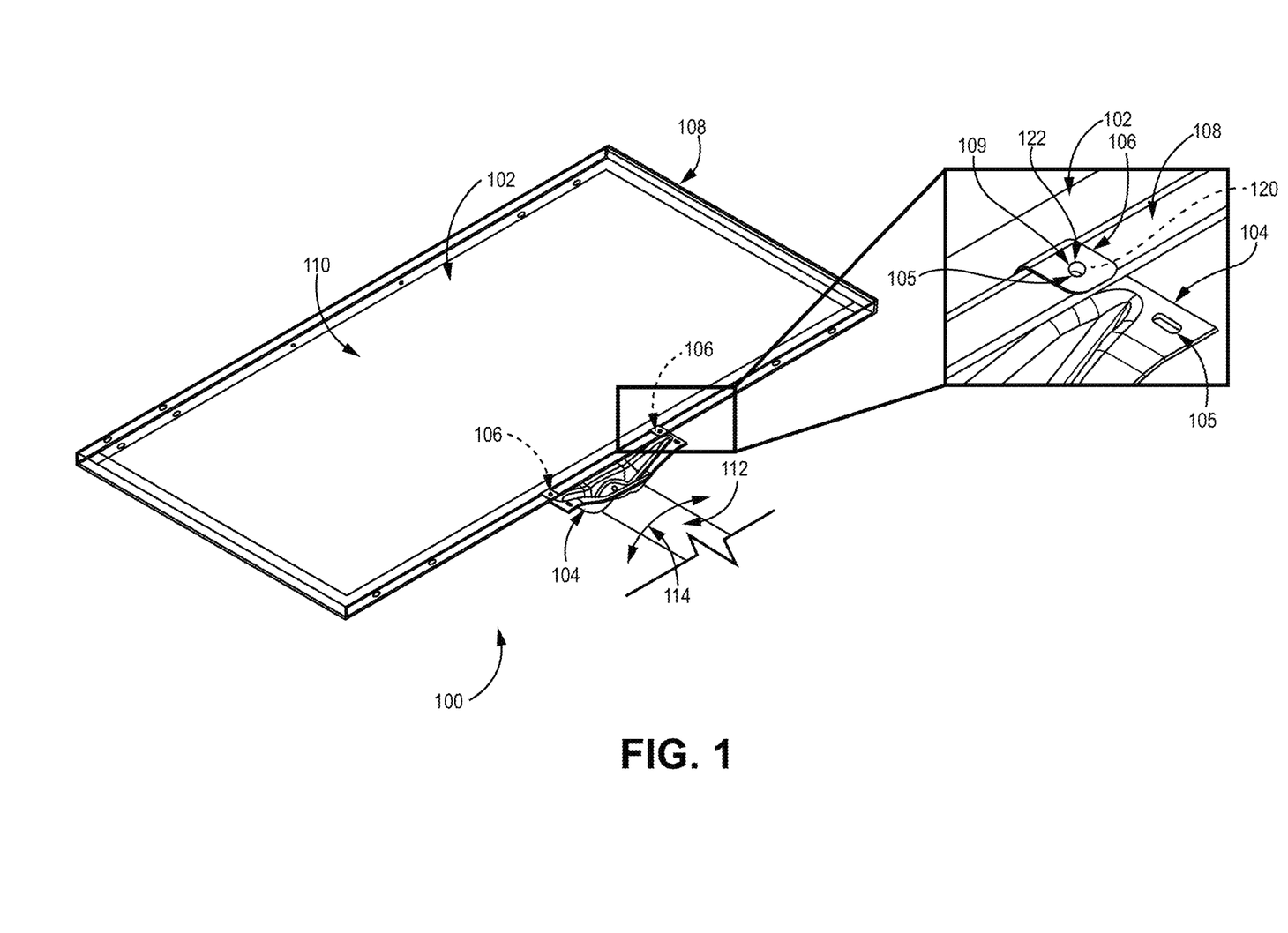
FIG. 1 is a perspective view of an embodiment of a solar module system.

FIG. 1 is a perspective view of an embodiment of a solar module system 100. The solar module system 100 can include one or more solar modules 102, a support rail 104, and one or more washer clip devices 106. The solar module 102 can include a frame 108 and a plurality of photovoltaic cells 110. The frame 108 can bound the photovoltaic cells 110 and form a perimeter of the solar module 102 (e.g., with the frame 108 being made of a different material than that of the photovoltaics cells 110). The support rail 104 is configured to couple one or more solar modules 102 (e.g., two solar module 102 at each, opposite side of the support rail 104) to a movable torque tube 112. The torque tube 112 can be actuated by a controller to cause the torque tube 112 to move, such as rotate about a longitudinal axis of the torque tube 112 in directions 114. As such, with one or more solar modules 102 coupled to the support rail 104, as the torque tube 112 is moved the one or more solar modules 102 coupled to the torque tube 112 are also moved. This can facilitate more optimized solar power generation at the photovoltaic cells 110 by adjusting the angle of the one or more solar modules 102 at one or more times (e.g., at times during a given day) to help "track" the sun as it moves over that period of time and, thereby, maintain more optimized positioning of the photovoltaic cells 110 relative to the angle of sunlight irradiation at that given time of the day.

In the illustrated embodiment, one or more washer clip devices 106 (e.g., two washer clip devices 106) to couple the solar module 102 to the support rail 104. The washer clip device 106 can have at least some of its structure positioned between the frame 108 of the solar module 102 and the support rail 104. For instance, as shown at FIG. 1, the washer clip device 106 can include a first clip arm 120, and the first clip arm 120 can be sandwiched between at least the frame 108 and the support rail 104. And, with the first clip arm 120 can be sandwiched between at least the frame 108 and the support rail 104, the washer clip device 106 can include a second clip arm (shown in other drawing figures) that is positioned at an opposite side of the support rail 104 as the first clip arm 120.

To help couple the washer clip device 106 to the support rail 104 and the solar module 102 (e.g., the frame 108), the washer clip device 106 can include a fastening aperture 122, the support rail 104 can include a support rail fastening aperture 105, and the frame 108 can include a frame fastening aperture 109. The washer clip device 106 can be positioned relative to the frame 108 and the support rail 104 such that the fastening aperture 122 at the first clip arm 120 is aligned with each of the support rail fastening aperture 105 and the frame fastening aperture 109 when the first clip arm 120 is sandwiched between at least the frame 108 and the support rail 104. And a fastening member (e.g., bolt, screw, etc.) can be inserted through the aligned fastening aperture 122, support rail fastening aperture 105, and frame fastening aperture 109 so that the washer clip device 106 couples the solar module 102 to the support rail 104.

For example, the illustrated embodiment of the solar module system 100 includes two washer clip devices 106 coupling the frame 108 to the support rail 104. Though in other embodiments within the scope of this disclosure, other numbers of washer clip devices 106 (e.g., a single washer clip device 106) can be used as appropriate for the particular solar module system application.

Figure 2A:
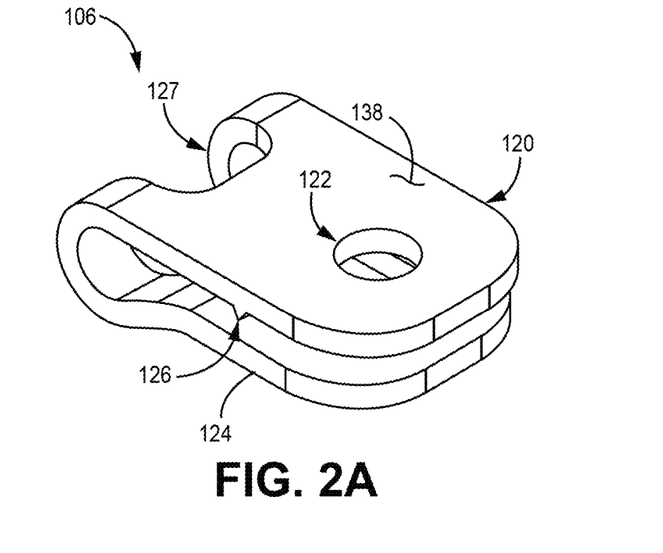
FIG. 2A is a perspective view generally of a top portion of the washer clip device.
Figure 2B:
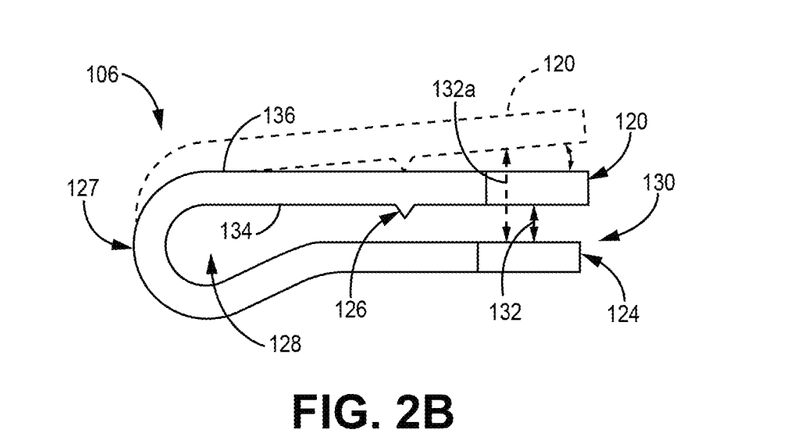
FIG. 2B is a side elevational view of the washer clip device.
Figure 2C:
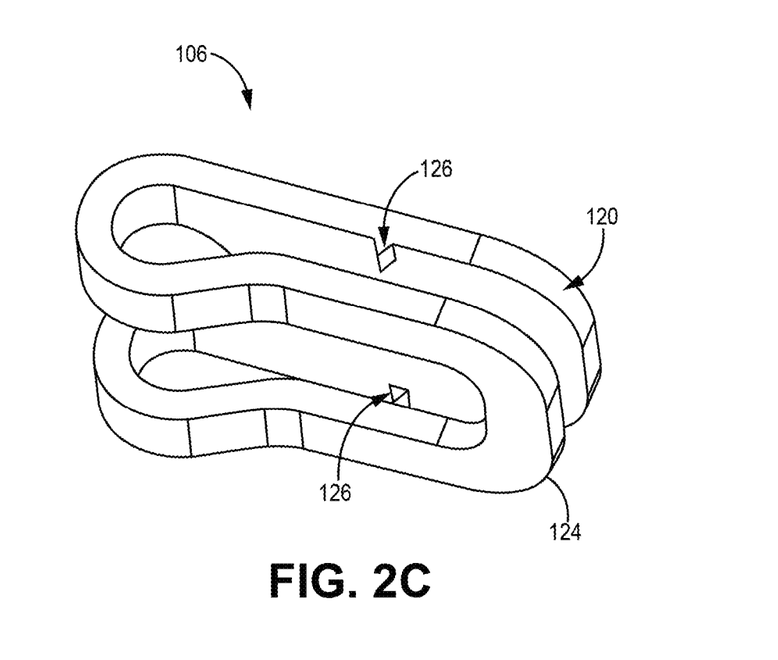
FIG. 2C is a perspective view generally of a bottom portion of the washer clip device.

FIGS. 2A-2C illustrate an embodiment of the washer clip device 106. In particular, FIG. 2A is a perspective view generally of a top portion of the washer clip device 106, FIG. 2B is a side elevational view of the washer clip device 106, and FIG. 2C is a perspective view generally of a bottom portion of the washer clip device 106.

The washer clip device 106 can include the first clip arm 120, a second clip arm 124, at least one grounding element 126 at the first clip arm 120 and/or the second clip arm 124, and the fastening aperture 122 extending through the first clip arm 120. The first clip arm 120 and the second clip arm 124 can be joined together at a first end 127 of the washer clip device 106 to define a first internal clip area 128 adjacent the first end 127. The first clip arm 120 and the second clip arm 124 can be spaced apart from one another at a second end 130 of the washer clip device 106 to define a receiving gap 132 between the first clip arm 120 and the second clip arm 124 and adjacent to the second end 130. The receiving gap 132 can be configured to receive at least the frame 108 of the solar module 102, such as shown at FIG. 1.

In addition, the first clip arm 120 of the washer clip device 106 can include an internal surface 134 that faces the second clip arm 124 and an external surface 136 that is opposite the internal surface 134. The fastening aperture 122 can extend through the first clip arm 120 by extending from the external surface 136 and through the first clip arm to the internal surface 134. The external surface 136 of the first clip arm 120 can include a planar external panel support surface 138, and the planar external panel support surface 138 can be positioned to directly interface with the frame 108, such as shown at the example of FIG. 1. The external panel support surface 138 can extend along the external surface 136 of the first clip arm 120 from, or near, the second end 130 toward the first end 127 to a location at or near where the first clip arm 120 is joined with the second clip arm 124.

As noted, the washer clip device 106 can include at least one grounding element 126. The illustrated embodiment of the washer clip device 106 includes two grounding elements 126, though in other embodiments other numbers of grounding elements 126 can be included. The at least one grounding element 126 can be located at the first clip arm 120 and/or the second clip arm 124. As shown here, the at least one grounding element 126 is located at the first arm 120, and, more specifically, is located at the internal surface 134 of the first clip arm 120 and projects outward from the internal surface 134 toward the second clip arm 124. For the illustrated embodiment, one grounding element 126 is located adjacent a first longitudinal side surface of the first clip arm 120 and another grounding element is located adjacent a second, opposite longitudinal side surface of the first clip arm 120. The at least one grounding element 126 can have a smaller (e.g., "pointed") diameter end (e.g., of a triangle-shaped cross-section) that is opposite a larger diameter end that is at the internal surface 134. The washer clip device 106, including the at least one grounding element 126 and the first clip arm 120, can include an electrically conductive material, and this electrically conductive material can be in contact with the solar module 102 (e.g., in contact with the solar module frame 108, such as shown at FIG. 1, which can also include an electrically conductive material). Accordingly, the washer clip device 106, including the at least one grounding element 126 and the first clip arm 120 with the electrically conductive material, can be configured to provide an electrical grounding function in association with the solar module 102.

The washer clip device 106 can be movable between a coupling configuration and a receiving configuration. This can include movement of one of the first and second clip arms 120, 124 or both of the first and second clip arms 120, 124. Referring to FIG. 2B specifically, one exemplary coupling configuration of the washer clip device 106 is shown, while one exemplary receiving configuration of the washer clip device 106 is also shown by the dashed lines represented a moved position of the first clip arm 120. The first clip arm 120 and the second clip arm 124 can be spaced further apart at, or near, the second end 130 when the washer clip device 106 is in the receiving configuration than when the washer clip device 106 is in the coupling configuration. Likewise, the receiving gap 132, defined at the washer clip device 106, can be larger when the washer clip device 106 is in the receiving configuration than when the washer clip device 106 is in the coupling configuration. For example, as shown at the embodiment of FIG. 2B, the receiving gap 132 can increase to a receiving configuration receiving gap 132*a* when the washer clip device 106 is moved to the receiving configuration.

The ability of the washer clip device 106 to move between the receiving and coupling configurations can be useful in allowing the frame 108 to be received between the first and second clip arms 120, 124 when the washer clip device 106 is in the receiving configuration yet also allow a sufficient magnitude of clamping force to be applied at the frame 108 by one of both of the first and second clip arms 120, 124 when the washer clip device 106 is in the coupling configuration.

In some embodiments, the washer clip device 106 can be biased to the coupling configuration (e.g., at least the first clip arm 120 is biased to the coupling configuration). And to help facilitate movement of the washer clip device 106 between the coupling and receiving positions, the first clip arm 120 and the second clip arm 124 can be elastically movable from the coupling configuration to the receiving configuration. Accordingly, upon application of a sufficient actuation force at the washer clip device 106 (e.g., an actuation force applied by an installer's hand(s)), the biasing force at the washer clip device 106 (e.g., at the first clip arm 120) can be overcome and the first clip arm 120 and/or the second clip arm 124 can be elastically deformed to move from the coupling configuration to the receiving configuration. Then, upon removal of the actuation force at the washer clip device 106, the biasing force at the washer clip device 106 can urge to washer clip device back to the coupling configuration. For instance, in various such embodiments, the first end 127 of the washer clip device 106, where the first clip arm 120 and the second clip arm 124 are joined together, can be configured to apply the biasing force at the second end 130 of the washer clip device 106 to bias the washer clip device 106 to the coupling configuration. When the washer clip device 106 is in the coupling configuration, the first clip arm 120 and the second clip arm 124 can be spaced further apart where the first internal clip area 128 is defined than where the receiving gap 130 is defined. As one example, when the washer clip device 106 is in the coupling configuration, the first clip arm 120 and the second clip arm 124 can be spaced apart by a distance ranging from 2.5 mm to 4.5 mm (e.g., ranging from 3.0 to 4.0 mm) where the receiving gap 130 is defined so as to accommodate reception thereat the frame 108 of the solar module 102, and the first clip arm 120 and the second clip arm 124 can be spaced apart by a greater distance where the first internal clip area 128 is defined.

Figure 3:
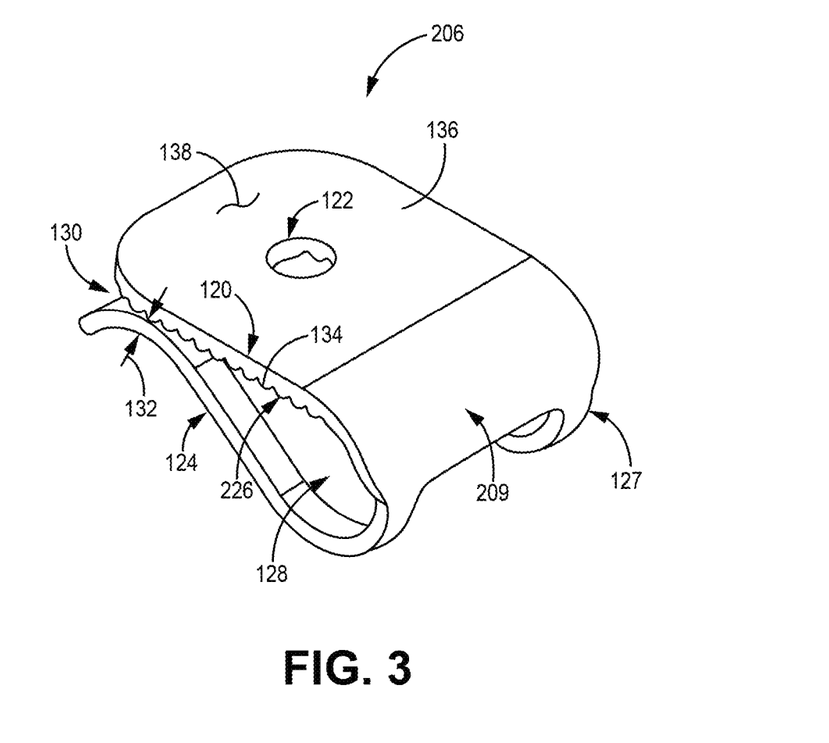
FIG. 3 is a perspective view of another embodiment of a washer clip device.

FIG. 3 illustrates a perspective view of another embodiment of a washer clip device 206. The washer clip device 206 can be similar to, or the same as, the washer clip device 106 described and illustrated elsewhere in this disclosure (and thus like reference characters denote like elements) except as otherwise noted here or illustrated at FIG. 3.

The illustrated embodiment of the washer clip device 206 can include a plurality of grounding elements 226, which can be similar to, or the same as, the grounding element 126 previously disclosed except as otherwise noted here. The plurality of grounding elements 226 can be located at the first clip arm 120, and, more specifically, as shown here, located at the internal surface 134 of the first clip arm 120 and project outward from the internal surface 134 toward the second clip arm 124. For the illustrated embodiment, the plurality of grounding elements 226 can extend along a width of the internal surface 134 from one longitudinal side of the internal surface 134 to another, opposite longitudinal side of the internal surface 134. The plurality of grounding elements 226 can have a smaller (e.g., "rounded") diameter end that is opposite a larger diameter end that is at the internal surface 134. As described previously herein, the plurality of grounding element 226 and the first clip arm 120 can be configured to provide an electrical grounding function in association with the solar module 102.

The illustrated embodiment of the washer clip device 206 can also include an extended flange 209. The extended flange 209 can extend along a width of the washer clip device 206 between opposite longitudinal side surfaces of the washer clip device 206. The extended flange 209 can be configured to provide increased biasing force at the washer clip device 206 to the coupling configuration. This increased biasing force to the coupling configuration can be useful for certain solar module system embodiments that may benefit from increased robustness at the component couplings.

Figure 4:
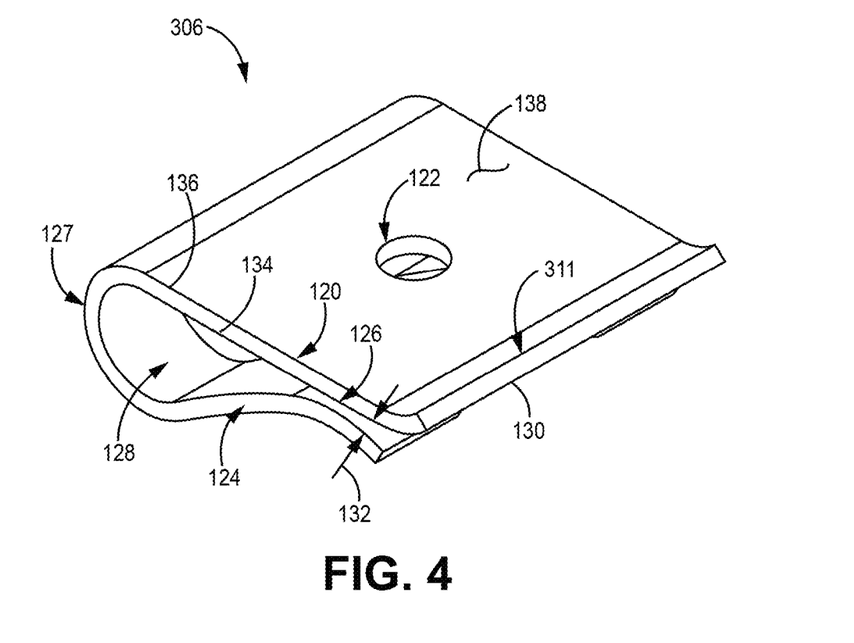
FIG. 4 is a perspective view of a further embodiment of a washer clip device.

FIG. 4 illustrates a perspective view of another embodiment of a washer clip device 306. The washer clip device 306 can be similar to, or the same as, the washer clip device 106 described and illustrated elsewhere in this disclosure (and thus like reference characters denote like elements) except as otherwise noted here or illustrated at FIG. 4.

The illustrated embodiment of the washer clip device 306 can include a ramp surface 311. The ramp surface 311 can be located at, or near, the second end 130 of the washer clip device 306 and at the first clip arm 120. The ramp surface 311 can interface with the external panel support surface 138 and extend from the end of the external panel support surface 138 (e.g., extend from where the planar external panel support surface 138 terminates) to the second end 130 at the first clip arm 120. The ramp surface 311 can extend from a first elevation adjacent the external panel support surface 138 to a second, different elevation adjacent the second end 130. For example, as illustrated for the embodiment shown at FIG. 4, the second elevation of the ramp surface 311 adjacent the second end 130 can be further away from the second arm 124 than the first elevation of the ramp surface 311 adjacent the external panel support surface 138 when the washer clip device 306 is in the coupling configuration. This second elevation of the ramp surface 311 adjacent the second end 130 can position the ramp surface 311, adjacent the second end 130, at a different (e.g., greater) elevation than the external panel support surface 138. For instance, the external panel support surface 138 can be positioned underneath the frame 108 of the solar module 102 while the ramp surface 311 can be positioned at a side surface of the frame 108 of the solar module 102. The presence of the ramp surface 311 can help to provide an interference force at the frame 108 to help impede movement of the frame 108 relative to the washer clip device 306.

Figure 5A:
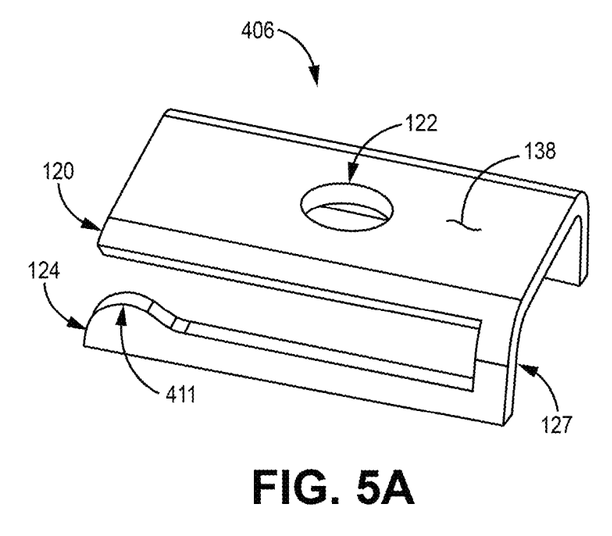
FIG. 5A is a perspective view generally of a top portion of the washer clip device.
Figure 5B:
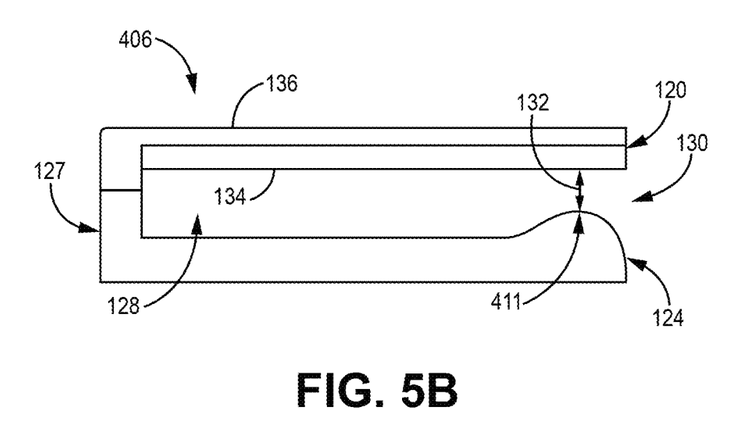
FIG. 5B is a side elevational view of the washer clip device.
Figure 5C:
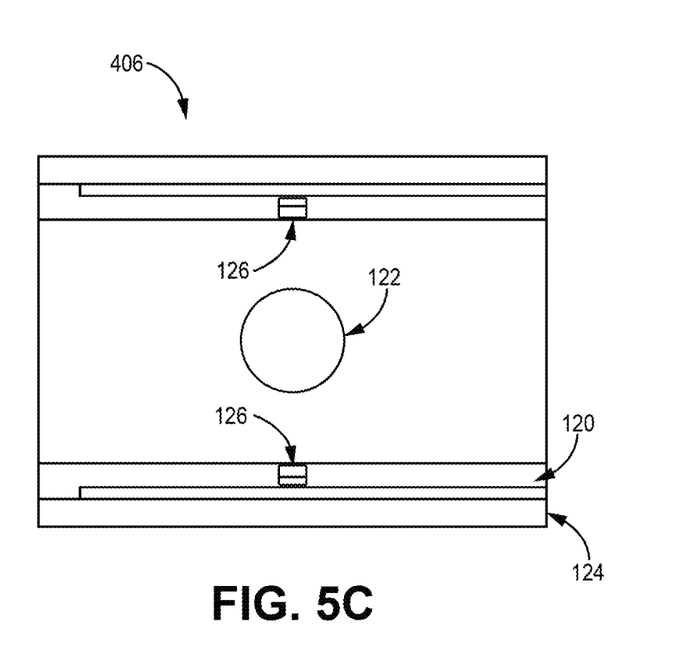
FIG. 5C is a bottom plan view of the washer clip device.

FIGS. 5A-5C illustrate another embodiment of a washer clip device 406. In particular, FIG. 5A is a perspective view generally of a top portion of the washer clip device 406, FIG. 5B is a side elevational view of the washer clip device 406, and FIG. 5C is a bottom plan view of the washer clip device 406. The washer clip device 406 can be similar to, or the same as, the washer clip device 106 described and illustrated elsewhere in this disclosure (and thus like reference characters denote like elements) except as otherwise noted here or illustrated at FIGS. 5A-5C.

The illustrated embodiment of the washer clip device 406 can include a ramp surface 411. The ramp surface 411 can be located at, or near, the second end 130 of the washer clip device 406 and at the second clip arm 124 (e.g., at each of the two clip arms 124). The ramp surface 411 can define a transition from the first internal clip area 128 to the receiving gap 132. The ramp surface 411 can extend from a first elevation adjacent the first internal clip area 128 to a second, different elevation adjacent the second end 130. For example, as illustrated for the embodiment shown at FIGS. 5A-5C, the second elevation of the ramp surface 411 adjacent the second end 130 can be closer to the first clip arm 120 than the first elevation of the ramp surface 411 adjacent the first internal clip area 128 when the washer clip device 406 is in the coupling configuration, as shown, for instance, at FIG. 5B. This second elevation of the ramp surface 411 adjacent the second end 130 can position the ramp surface 411, adjacent the second end 130, at a different (e.g., greater) elevation than at least a portion of the second clip arm 124 defining the first internal clip area 128. The presence of the ramp surface 411 can help to provide an interference force at the support rail 104 to help impede movement of the support rail 104 relative to the washer clip device 406.

In some embodiments, a washer clip device can have both the ramp surface 411 at the second clip arm 124, such as disclosed with respect to the washer clip device 406, and the ramp surface 311 at the first clip arm 120, such as disclosed with respect to the washer clip device 306.

Figure 6:
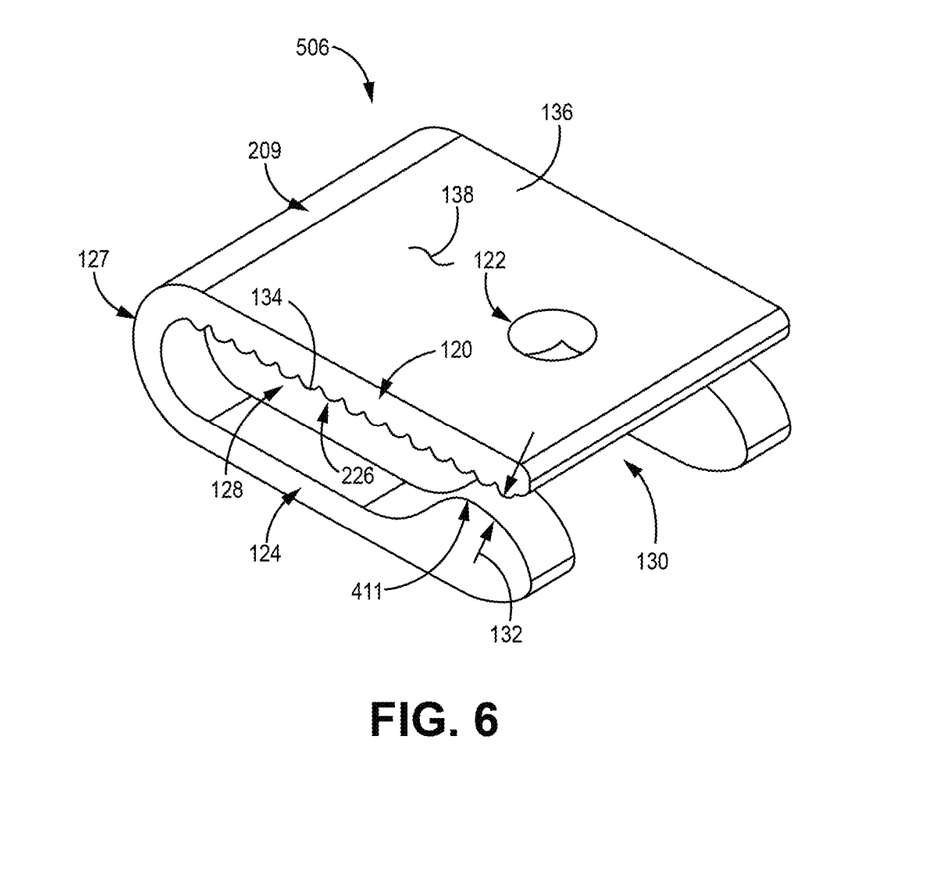
FIG. 6 is a perspective view of an additional embodiment of a washer clip device.

FIG. 6 illustrates a perspective view of an additional embodiment of a washer clip device 506. The washer clip device 506 can be similar to, or the same as, the washer clip device 106 described and illustrated elsewhere in this disclosure (and thus like reference characters denote like elements) except as otherwise noted here or illustrated at FIG. 6.

The illustrated embodiment of the washer clip device 506 can include the plurality of grounding elements 226 and the extended flange 209, which have been previously described. The plurality of grounding elements 226 can, for instance, help to provide an electrical grounding function in association with the solar module 102. The plurality of grounding elements 226 can be located at the internal surface 134 of the first clip arm 120 and project outward from the internal surface 134 toward the second clip arm 124, and the plurality of grounding elements 226 can extend along a width of the internal surface 134 from one longitudinal side of the internal surface 134 to another, opposite longitudinal side of the internal surface 134. The plurality of grounding elements 226 can have a smaller (e.g., "rounded") diameter end that is opposite a larger diameter end that is at the internal surface 134. The extended flange 209 can extend along a width of the washer clip device 506 between opposite longitudinal side surfaces of the washer clip device 506, and the extended flange 209 can be configured to provide increased biasing force at the washer clip device 406 to the coupling configuration.

Also within the scope of the present disclosure are various embodiments of methods of installing a washer clip device and/or methods of installing a solar module system that includes a washer clip device. Such method embodiments can incorporate use of any one or more features disclosed elsewhere herein.

As one such example, a method of installing a washer clip device can include transitioning the washer clip device from a coupling configuration to a receiving configuration; with the washer clip device is in the receiving configuration positioning a first clip arm of the washer clip at a first side of a support rail such that a fastening aperture at the first clip arm is aligned with a support rail fastening aperture; with the washer clip device is in the receiving configuration positioning a second clip arm of the washer clip device at a second side (e.g., opposite the first side) of the support rail; with the first and second rail support arms positioned at opposite sides of the support rail transitioning the washer clip device from the receiving configuration to the coupling configuration; positioning a solar module (e.g., a frame of a solar module) in contact with the first clip arm such that a frame fastening aperture of the solar module is aligned with the fastening aperture at the first clip arm; and inserting a fastening member into each of the frame fastening aperture, the fastening aperture, and the support rail fastening aperture.

Various examples have been described. These and other examples are within the scope of the following claims.

What is claimed is:

1. A solar module system comprising:
a solar module comprising a frame and a plurality of photovoltaic cells;
a support rail configured to couple the solar module to a movable torque tube; and
a washer clip device that couples the solar module to the support rail, the washer clip device comprising:
a first clip arm,
a second clip arm, the first clip arm and the second clip arm joined together at a first end of the washer clip device to define a first internal clip area adjacent the first end, the first clip arm and the second clip arm spaced apart from one another at a second end of the washer clip device to define a receiving gap between the first clip arm and the second clip arm and adjacent to the second end, the receiving gap configured to receive at least the frame of the solar module,
wherein the first clip arm comprises an internal surface that faces the second clip arm and an external surface that is opposite the internal surface, wherein the external surface of the first clip arm comprises a planar external panel support surface and the internal surface of the first clip arm comprises a planar internal surface that extends parallel to the planar external panel support surface, and wherein the planar external panel support surface is positioned to directly interface with the frame,
at least one grounding element at the planar internal surface of the first clip arm and projecting toward the second clip arm, and
a fastening aperture extending through the first clip arm,
wherein the washer clip device is movable between a coupling configuration and a receiving configuration, wherein the receiving gap is larger when the washer clip device is in the receiving configuration than when the washer clip device is in the coupling configuration.

2. The system of claim 1, wherein the first clip arm is sandwiched between at least the frame and the support rail.

3. The system of claim 2, wherein the support rail comprises a support rail fastening aperture, and wherein the fastening aperture at the first clip arm is aligned with the support rail fastening aperture when the first clip arm is sandwiched between at least the frame and the support rail.

4. The system of claim 1, wherein the washer clip device, including the at least one grounding element and the first clip arm, comprises an electrically conductive material, and wherein the electrically conductive material is in contact with the solar module.

5. The system of claim 1, wherein the washer clip device is biased to the coupling configuration.

6. The system of claim 5, wherein the first clip arm and the second clip arm are elastically movable from the coupling configuration to the receiving configuration.

7. The system of claim 6, wherein, when the washer clip device is in the coupling configuration, the first clip arm and the second clip arm are spaced further apart where the first internal clip area is defined than where the receiving gap is defined.

8. The system of claim 7, wherein, when the washer clip device is in the coupling configuration, the first clip arm and the second clip arm are spaced apart by a distance ranging from 2.5 mm to 4.5 mm where the receiving gap is defined.

9. The system of claim 7, wherein the first end of the washer clip device, where the first clip arm and the second clip arm are joined together, is configured to apply a biasing force at the second end of the washer clip device to bias the washer clip device to the coupling configuration.

10. A washer clip device comprising:
a first clip arm,
a second clip arm, the first clip arm and the second clip arm joined together at a first end of the washer clip device to define a first internal clip area adjacent the first end, the first clip arm and the second clip arm spaced apart from one another at a second end of the washer clip device to define a receiving gap between the first clip arm and the second clip arm and adjacent to the second end,
wherein the first clip arm comprises an internal surface that faces the second clip arm and an external surface that is opposite the internal surface, wherein the external surface of the first clip arm comprises a planar external panel support surface and internal surface of the first clip arm comprises a planar internal surface that extends parallel to the planar external panel support surface,
at least one grounding element at the planar internal surface of the first clip arm, and a fastening aperture extending through the first clip arm, wherein the washer clip device is movable between a coupling configuration and a receiving configuration, wherein the receiving gap is larger when the washer clip device is in the receiving configuration than when the washer clip device is in the coupling configuration.

11. The device of claim 10, wherein the first end of the washer clip device is opposite the second end of the washer clip device, and wherein the planar external panel support surface is configured to support thereat a solar module.

12. The device of claim 10, wherein the at least one grounding element projects outward from the internal surface toward the second clip arm.

13. The device of claim 12, wherein the washer clip device, including the at least one grounding element and the first clip arm, comprises an electrically conductive material to provide electrical grounding.

14. The device of claim 10, wherein the washer clip device is biased to the coupling configuration.

15. The system of claim 14, wherein the first clip arm and the second clip arm are elastically movable from the coupling configuration to the receiving configuration.

16. The system of claim 15, wherein, when the washer clip device is in the coupling configuration, the first clip arm and the second clip arm are spaced further apart where the first internal clip area is defined than where the receiving gap is defined.

17. The system of claim 16, wherein, when the washer clip device is in the coupling configuration, the first clip arm and the second clip arm are spaced apart by a distance ranging from 2.5 mm to 4.5 mm where the receiving gap is defined.

18. The system of claim 16, wherein the first end of the washer clip device, where the first clip arm and the second clip arm are joined together, is configured to apply a biasing force at the second end of the washer clip device to bias the washer clip device to the coupling configuration.

* * * * *